April 18, 1939. O. W. EAGAR 2,154,498
EXPANDING PIPE PLUG
Filed May 20, 1938

OSCAR W. EAGAR
INVENTOR

ATTORNEY

Patented Apr. 18, 1939

2,154,498

UNITED STATES PATENT OFFICE 2,154,498

EXPANDING PIPE PLUG

Oscar W. Eagar, Taft, Calif.

Application May 20, 1938, Serial No. 209,055

4 Claims. (Cl. 138—89)

The invention relates to an expanding or expansive plug for temporarily stopping the ends of pipes.

In the repairing of pipe lines and on similar occasions it is often necessary to cut away a portion of the pipe. During the period required for threading and refitting, an undesirable drainage from the open end is likely to occur.

The device herein described is intended to effect a temporary, leak-proof closure of the open end without interfering with operations which it may be necessary to perform on the pipe, such as rethreading or welding on fittings. It is particularly useful as a safety device to prevent oil or gas from leaking into a welding flame.

Figure 1:
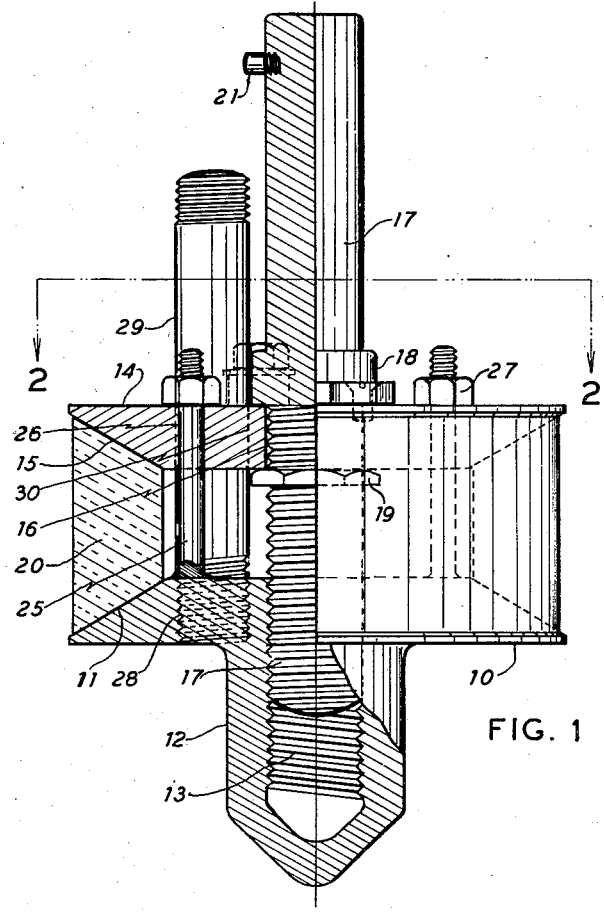
Figure 2:
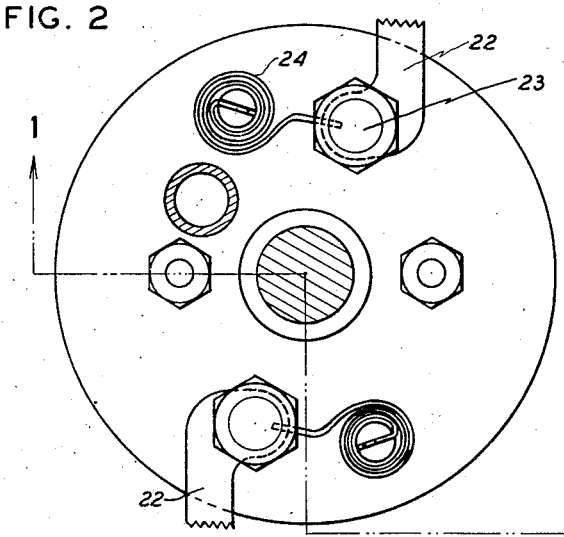

The device of the invention is illustrated in the attached drawing, in which Fig. 1 represents the device partly in elevation and partly in section, as on the line 1—1 of Fig. 2, while the latter is an end view of the device as on the line 2—2 of Fig. 1.

Referring to the drawing, 10 is a round metallic plate of a diameter slightly less than the internal diameter of the pipe in which it is to be used, this plate being bevelled around its periphery as at 11. This plate is provided with a projection 12 which is bored and internally threaded as at 13.

In an opposed position I place a plate 14 which is bevelled as at 15 and is centrally bored as at 16 for the passage of a temper screw 17 which enters the threads 13. This screw in turn is provided with collars 18 and 19 by which its longitudinal position in plate 14 is fixed.

Between the opposed bevelled edges 11 and 15 I place a ring 20 of rubber or other elastic material which, on the clockwise revolution of the temper screw, is expanded by approach to each other of the bevelled plates into a powerful and nonleaking engagement with the internal surface of the pipe. A stud 21 may be projected from the outer end of temper screw 17 for the application of a turning key, or the end may be squared for the application of a wrench. The stud is preferable as it permits the placing and withdrawal of the plug from far enough back in the pipe to avoid its damage by welding heat, and also permits the use of a speed wrench by which it may be handled rapidly.

To prevent the plug from turning in the pipe while the temper screw is being tightened I prefer to provide one or more toothed dogs 22 which are swiveled from plate 14 on studs and are urged toward the position shown in Fig. 2 by any convenient spring means, such as indicated at 24. On left hand rotation of the plate these dogs fold inwardly to enter the pipe, while on right hand rotation they grip firmly the inside of the pipe.

It is desirable to project two or more studs 25 from the lower plate through openings 26 in the upper plate and to provide these studs with outside nuts 27. These studs regulate the maximum spacing of the plates, maintain alignment, and prevent shifting of elastic ring 20, while permitting the plates to be drawn toward each other by temper screw 17. They also inhibit the possibility of temper screw 17 backing out of the socket and leaving the lower plate 10 in the pipe.

It is also desirable, though not essential, to bore through the lower plate and thread as at 28 and to screw into this bore a pipe nipple 29 slidably fitting an unthreaded bore 30 in the upper plate. The outer end of this nipple may be provided with any convenient valve or cock, not shown, for releasing any pressure which may have accumulated in the pipe during the period of use, thus avoiding danger of the forcible ejection of the plug when the temper screw is backed off and the plug released.

The device described may be applied and removed instantly, forms a perfect seal, and, being no larger than the inner diameter of the pipe, does not interfere with operations such as threading which may need to be performed on the cut end.

I claim as my invention:

1. A temporary pipe plug comprising two plates adapted to enter the pipe and having opposed peripheral bevelled faces formed thereon, a ring of elastic material interposed between said bevelled faces, rotational means for drawing said plates toward each other to expand said ring into engagement with the inner wall of the pipe, and dogs swiveled on one of said plates and arranged to prevent rotation of the plug within the pipe in the positive direction of said rotational means.

2. A temporary pipe plug comprising two plates adapted to enter the pipe and having opposed peripheral bevelled faces formed thereon, a ring of elastic material interposed between said bevelled faces, means for drawing said plates toward each other to expand said ring into engagement with the inner wall of the pipe, and a threaded pipe nipple passing through both said plates and made fast in one only of said plates.

3. A temporary pipe plug comprising two plates adapted to enter the pipe and having opposed peripheral bevelled faces formed thereon, a ring of elastic material interposed between said bevelled faces, means for drawing said plates toward each other to expand said ring into engagement with the inner wall of the pipe, and studs projected from one of said plates and slidable through the other of said plates, and nuts on said studs for fixing the maximum spacing of said plates.

4. A temporary pipe plug comprising: two plates adapted to enter the pipe and having opposed peripheral bevelled faces formed thereon, the first said plate being provided with a threaded blind socket and the second with an opening aligned with said socket; a ring of elastic material interposed between said bevelled faces; and a temper screw entering said threaded socket, passing through said opening, and having a collar engaging said second plate, whereby said plates may be drawn together to expand said ring into engagement with the inner wall of the pipe.

OSCAR W. EAGAR.